Shaw & Dawson,
Harness Saddle.
N° 63,108.   Patented Mar. 19, 1867.
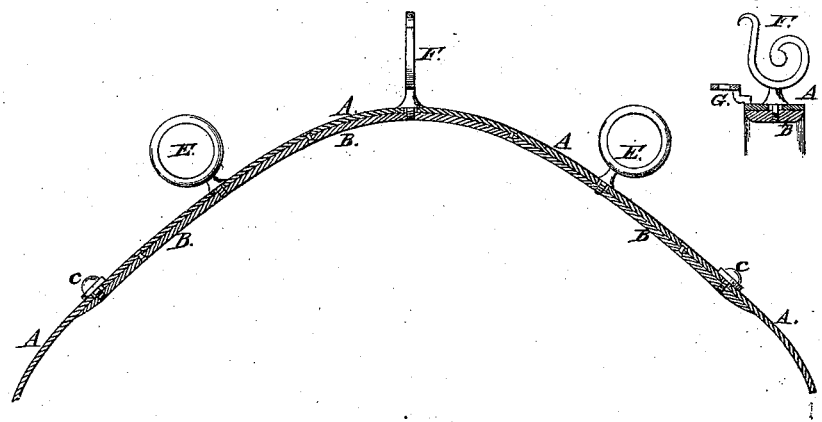
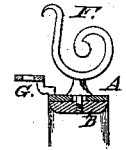
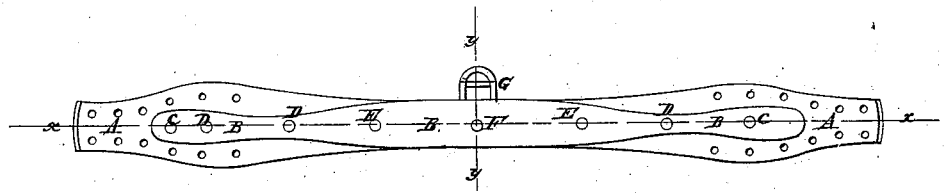
Witnesses:
F. A. Jackson
Jas. A. Service
Inventor
P. Shaw
E. T. Dawson
Per Munn & Co
Attorneys

United States Patent Office.

PALMER SHAW AND EDWARD S. DAWSON, OF SYRACUSE, NEW YORK.

Letters Patent No. 63,108, dated March 19, 1867.

IMPROVED PAD-PLATE FOR HARNESS.

*The Schedule referred to in these Letters Patent and making part of the same.*

TO ALL WHOM IT MAY CONCERN:

Be it known that we, PALMER SHAW and EDWARD S. DAWSON, of Syracuse, in the county of Onondaga, and State of New York, have invented a new and useful improvement in Pad-Plates for Harness-Saddles; and we do hereby declare that the following is a full, clear, and exact description thereof, which will enable others skilled in the art to make and use the same, reference being had to the accompanying drawings, forming part of this specification, in which—

Figure 1 is a longitudinal central section of our improved pad-plate, taken through the line $x\ x$, fig. 2.

Figure 2 is a view of the under side of the same.

Figure 3 is a cross-section of the same taken through the line $y\ y$, fig. 2.

Similar letters of reference indicate like parts.

Our invention has for its object to furnish an improved pad-plate for harness-saddles, which shall be light, strong, and easily and cheaply constructed; and it consists in the combination of a wrought-iron or steel outer plate with a malleable-iron inner plate, the parts being constructed as hereinafter more fully described.

A is the outer plate, which is made of wrought iron or steel. The plate A is cut out of rolled metal, of the proper thickness, in a press, and then struck up into the desired shape in a drop, the lower ends being bent into such a shape as will fit around the body of the horse, as shown in fig. 1. The outer plate A is strengthened by an inner plate, B, which is made of malleable iron, and extends down along the under side of the outer plate A far enough to receive the pad-screws C. The plates A and B are secured together with rivets, D, as shown in figs. 1 and 2. The terrets E, check-hook F, and pad-screws C, are all screwed into the inner plate B, so that there is no necessity for the use of nuts to hold the said hook, terrets, and screws to their places.

G is a loop formed upon the rear edge of the plate B, to which the back-strap of the harness is attached. The plate B is made thicker, broader, and heavier at its middle part, where the greatest strength is required, and becomes gradually lighter as it passes down along the arms of the plate A. Near the ends it is again slightly enlarged to furnish a sufficient hold for the pad-screws C, as shown in fig. 2.

We claim as new, and desire to secure by Letters Patent—

As an article of manufacture, the pad-plate herein described, the same consisting of the struck-up plate of steel, A, strengthening plate of malleable iron, B, combined and provided with the loop G, substantially as and for the purpose specified.

The above specification of our invention signed by us this 15th day of June, 1866.

PALMER SHAW,
EDWARD S. DAWSON.

Witnesses:
JACOB BROWN,
ELIJAH M. SANDFORD.